United States Patent
Yuang et al.

(10) Patent No.: US 7,301,931 B2
(45) Date of Patent: Nov. 27, 2007

(54) HEXANARY-FEEDBACK CONTENTION ACCESS METHOD WITH PDF-BASED MULTI-USER ESTIMATION FOR WIRELESS COMMUNICATION NETWORKS

(75) Inventors: Maria Chi-Jui Yuang, Taipei (TW); Chih-Peng Lo, Taipei (TW); Ju-Ya Chen, Taipei (TW)

(73) Assignee: Institute for Information Industry, Taipei (TW)

( * ) Notice: Subject to any disclaimer, the term of this patent is extended or adjusted under 35 U.S.C. 154(b) by 963 days.

(21) Appl. No.: 10/434,203

(22) Filed: May 9, 2003

(65) Prior Publication Data

US 2004/0223453 A1    Nov. 11, 2004

(51) Int. Cl.
| | |
|---|---|
| H04J 3/00 | (2006.01) |
| H04J 1/16 | (2006.01) |
| H04J 3/14 | (2006.01) |
| H04J 3/24 | (2006.01) |
| H04L 1/00 | (2006.01) |
| H04L 12/26 | (2006.01) |
| G08C 15/00 | (2006.01) |
| G06F 11/00 | (2006.01) |
| G01R 31/08 | (2006.01) |
| H04H 1/00 | (2006.01) |

(52) U.S. Cl. ............... 370/345; 370/229; 370/312
(58) Field of Classification Search ............ 370/229, 370/335, 342, 441
See application file for complete search history.

(56) References Cited

U.S. PATENT DOCUMENTS

2002/0069032 A1*  6/2002  Huang et al. ............... 702/179
2002/0154653 A1* 10/2002  Benveniste ................. 370/447
2002/0154717 A1* 10/2002  Shima et al. ............... 375/349
2002/0163933 A1* 11/2002  Benveniste ................. 370/465
2003/0147655 A1*  8/2003  Shattil ........................ 398/182

OTHER PUBLICATIONS

John G. Proakis, "Digital Communications", Third Edition, 1995, pp. 863-873.*

* cited by examiner

Primary Examiner—Seema S. Rao
Assistant Examiner—Jianye Wu
(74) Attorney, Agent, or Firm—Bacon & Thomas, PLLC (57) ABSTRACT

A hexanary-feedback contention access method is provided in a wireless network having at least one base station capable of distinguishing at most 5 mobile stations concurrently requesting for register. A random procedure determines whether each mobile station is allowed proceeding contention access at a subsequent slot. The quantity of mobile stations capable of proceeding contention access at the subsequent slot is defined as a current mobile station quantity. If the quantity is from 2 to 5, a random procedure is performed based on the quantity to determine whether a contention access is proceeded at a subsequent slot. The mobile station quantity is then detected and if the quantity is 1, the mobile station is allowed for registration and the current mobile station quantity is decremented. If the current mobile station quantity is not equal to 0, the random procedure is repeated based on the current mobile station quantity.

14 Claims, 7 Drawing Sheets

Phase pdf under SNR=10dB

FIG. 6A

Phase pdf under SNR=20dB

HEXANARY-FEEDBACK CONTENTION ACCESS METHOD WITH PDF-BASED MULTI-USER ESTIMATION FOR WIRELESS COMMUNICATION NETWORKS

BACKGROUND OF THE INVENTION

1. Field of the Invention

The present invention relates to a contention access method for wireless communication networks and, more particularly, to a hexanary-feedback contention access (HFCA) method for wireless communication networks, which estimates the quantity of mobile stations (MSs) by using probability density function (pdf).

2. Description of Related Art

In recent years, wireless communication networks have been widely developed to satisfy the various wireless communication requirements, so that people have expected Quality of Service (QoS) to be provided variously and rapid. When multiple MSs are connected to the wireless communication network for services, the MSs have to register first at a corresponding base station (BS) in the wireless communication network. However, a slot of the BS only allows only one MS to register. Therefore, when multiple MSs are registering at the same slot, these MSs respectively send registration data to a BS with the slot by an uplink, so that the BS receives a number of undistinguishable signals because signals sent by the MSs are interfered in and imposed on each other. As such, the BS sends a collision signal to the MSs by a downlink and accordingly the MSs need to further perform a random procedure such as Controlled slotted-Aloha (CS-Saloha) to determine whether or not to register at a subsequent slot. If the quantity of MSs trying to register in the next slot exceeds one, the aforementioned random procedure for collision has to be repeated. This results in a poor performance because the quantity of MSs to be registered cannot be estimated accurately.

Therefore, it is desirable to provide an improved contention access method to mitigate and/or obviate the aforementioned problems.

SUMMARY OF THE INVENTION

An object of the present invention is to provide a hexanary-feedback contention access (HFCA) method for wireless communication networks, which can quickly resolve the contention problem.

Another object of the present invention is to provide an estimation method capable of estimating mobile station quantity by probability density function (pdf) for a wireless communication network, which can accurately estimate the mobile station quantity to be registered concurrently in the wireless communication network.

In accordance with one aspect of the present invention, there is provided a hexanary-feedback contention access (HFCA) method with probability density function (pdf) based multi-user estimation for a wireless communication network, which generates an registrable mobile station when a plurality of mobile stations concurrently request for registration in the wireless communication network at a slot, wherein the wireless communication network has at least one base station capable of distinguishing at most 5 mobile stations concurrently requesting for registration and notifies each mobile station of mobile station quantity detected via a downlink. The method comprises the steps: (A) using a random procedure to determine whether or not each mobile station to be registered is allowed proceeding contention access at a subsequent slot, wherein the quantity of mobile stations capable of proceeding contention access at the subsequent slot is defined as a current mobile station quantity; (B) detecting the current mobile station quantity by the base station, and performing step (C) if the current mobile station quantity ranges from 2 to 5; (C) performing a random procedure based on the current mobile station quantity to determine whether or not a contention access is proceeded at a subsequent slot for each current mobile station; (D) detecting a mobile station quantity by the base station, and allowing the mobile station with respect to the mobile station quantity for registration and reducing the current mobile station quantity by 1 if the mobile station quantity is 1; and (E) performing step (A) if the current mobile station quantity is 0, otherwise, performing step (C).

In accordance with another aspect of the present invention, there is provided an estimation method capable of estimating mobile station quantity by probability density function (pdf) for a wireless communication network having at least one base station which is pre-stored with pdf distribution curves of mixed signals caused by 1 to N mobile stations concurrently requesting for registration in the wireless communication network. The method comprises the steps of: (A) computing an envelope of a signal received by the base station; (B) deriving a distribution curve of probability density function (pdf) from the envelope; and (C) matching the distribution curve with the pdf distribution curves pre-stored for goodness-of-fit to estimate the mobile station quantity currently requesting for register in the wireless network.

In accordance with a further object of the present invention, there is provided an estimation method capable of estimating mobile station quantity by probability density function (pdf) for a wireless communication network having at least one base station which is pre-stored with pdf distribution curves of mixed signals caused by 1 to N mobile stations concurrently requesting for registration in the wireless communication network. The method comprises the steps of: (A) computing a phase of a signal received by the base station; (B) deriving a distribution curve of probability density function (pdf) from the phase; and (C) matching the distribution curve with the pdf distribution curves pre-stored for goodness-of-fit to estimate the mobile station quantity currently requesting for registration in the wireless network.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
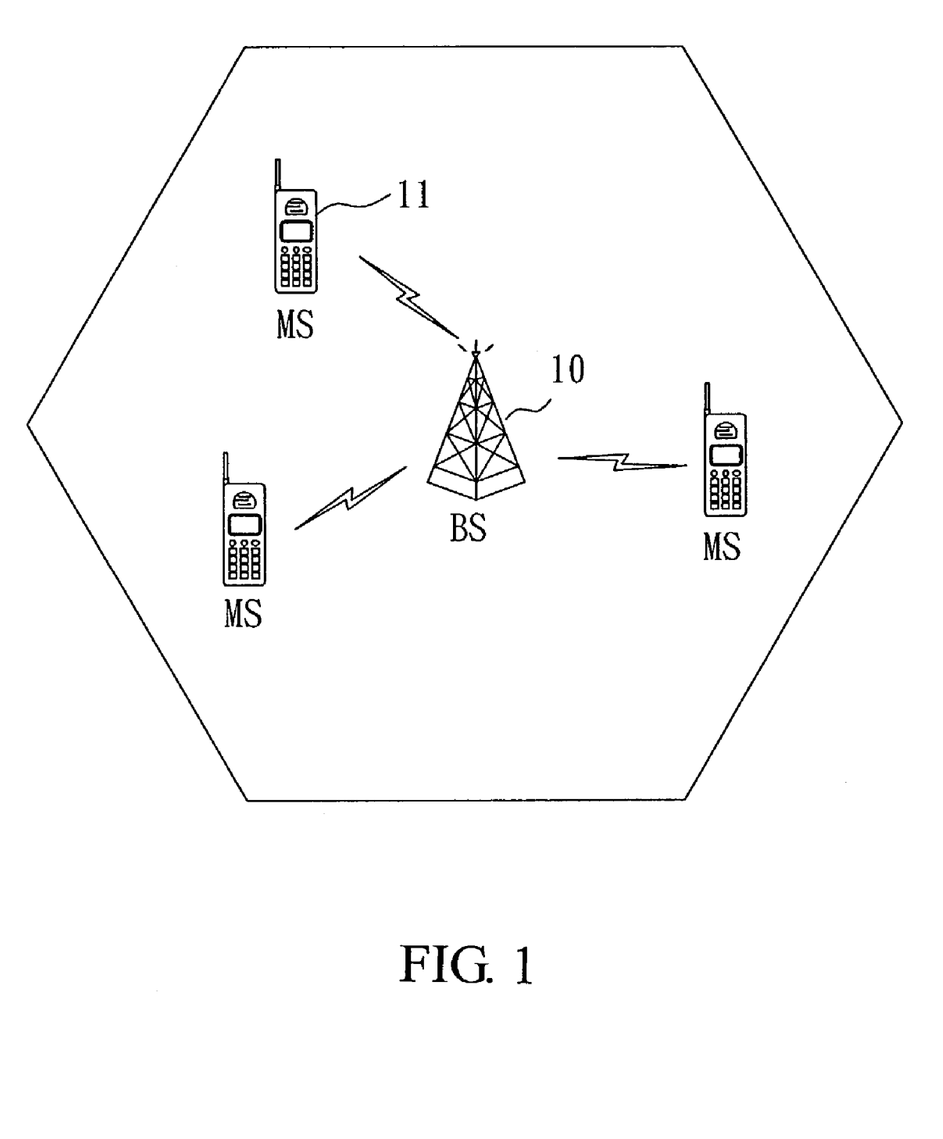
FIG. 1 is a schematic diagram of an embodied wireless communication network according to the invention.

With reference to FIG. 1, there is shown a wireless network for executing the inventive hexanary-feedback contention access (HFCA) method in accordance with the present invention. The wireless communication is, for example, a wireless local area network (LAN). The wireless LAN includes at least one base station 10 and a plurality of mobile stations 11 that concurrently requests for register in the wireless LAN. The base station 10 has a database with pre-stored distribution curves of probability density functions (pdfs) for 1 to 5 mobile stations to be registered concurrently in the wireless LAN, so that at most 5 mobile stations to be registered concurrently in the wireless LAN can be distinguished. Accordingly, the base station 10 can select one mobile station for register according to the inventive hexanary-feedback contention access (HFCA) method.

Figure 2:
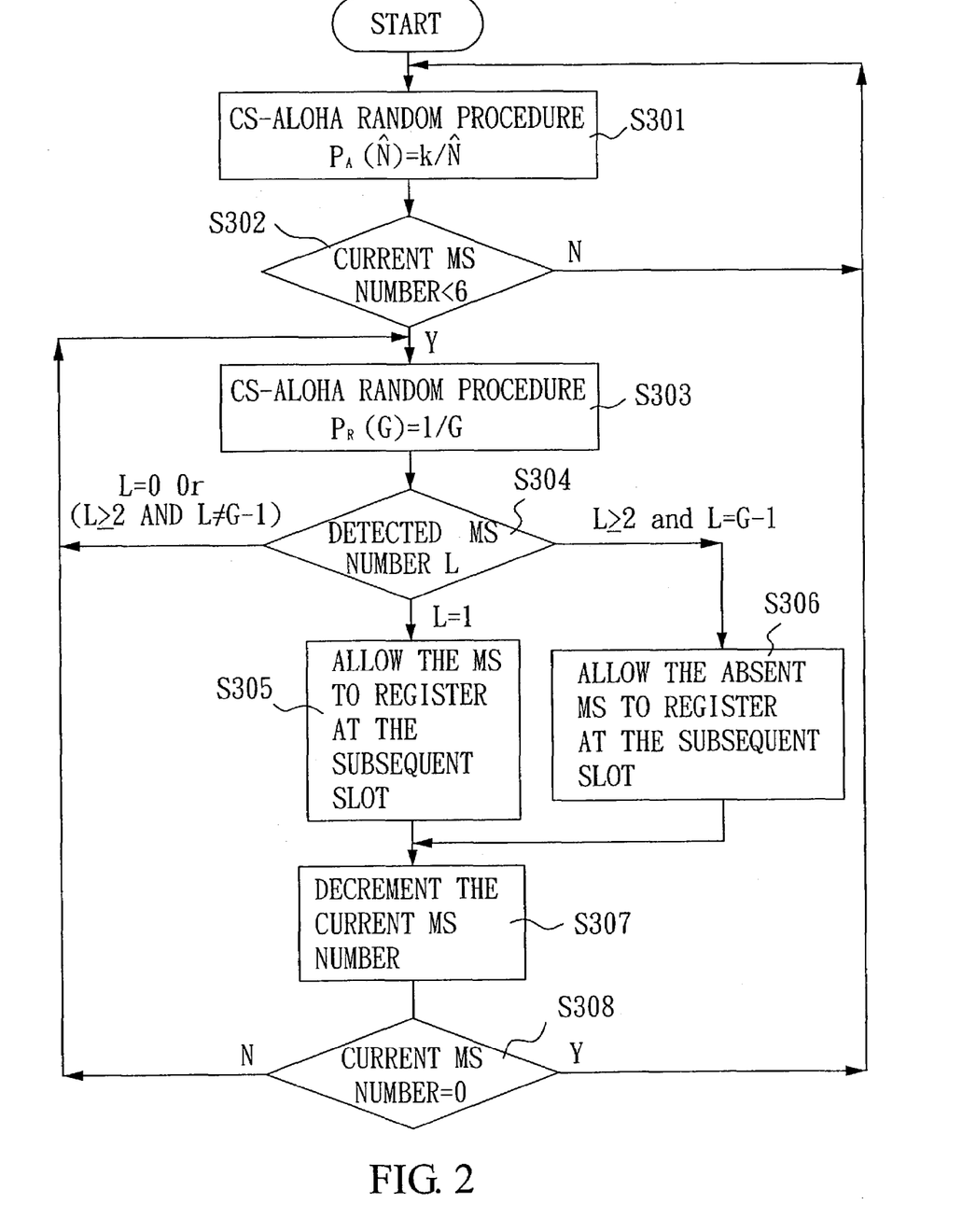
FIG. 2 is a flowchart of a contention access method according to the invention.

A flowchart of the inventive hexanary-feedback contention access (HFCA) method is shown in FIG. 2. In step S301 of FIG. 2, a random procedure is performed for each mobile station 11 to be registered to determine if a contention access is proceeded at a subsequent slot, wherein the quantity of mobile stations capable of proceeding contention access at the subsequent slot is defined as a current mobile station quantity G. The random procedure can be Controlled Slotted-Aloha (CS-Aloha) protocol with $P_A(\hat{N})=\kappa/\hat{N}$, where $\kappa$ is an optimal value yielding maximized saturated throughput, $\hat{N}$ is a predicted mobile quantity, regardless of the value $\kappa$. Generally, when $\hat{N}\approx 50$, we have $\kappa\approx 1.52$ (see FIG. 3).

In step S302, the base station 10 determines if the current mobile station quantity G is smaller than 6. If yes, step S303 is performed. If not, the process returns to step S301 as the quantity G is over 5 to cause it undistinguishable or first allows the mobile station 11 for register if the quantity G is 1 that indicates only the mobile station 11 for contention access and then returns to step S301 to perform the random procedure for other remaining mobile stations 11 to determine whether or not to proceed contention access at a subsequent slot.

In step S303, each current mobile station 11 performs a random procedure based on the current mobile station quantity detected by the base station 12 to determine whether or not a contention access is proceeded at a subsequent slot. The random procedure can be CS-Aloha protocol: $P_R(G)=1/G$, where G is the current mobile station quantity.

In step S304, the base station 10 detects mobile station quantity L to determine the quantity of mobile stations capable of proceeding contention access at the subsequent slot. If it is 1, this indicates only the mobile station 11 for contention access. Therefore, step S305 is performed and the mobile station 11 will be allowed for registration at the subsequent slot.

In step S304, when the mobile station quantity detected by the base station 10 is 0, it indicates that no mobile station 11 can proceed contention access after the random procedure is performed for each current mobile station. In this case, the process returns to step S303. When the mobile station quantity detected by the base station 10 is over 1 and not equal to the current mobile station quantity subtracted by 1 (i.e., L≧2 and L≠G−1), it indicates that a plurality of mobile stations 11 can proceed contention access after the random procedure is performed for each current mobile station. In this case, the process also returns to step S303.

In step S304, when the mobile station quantity detected by the base station 10 is over 1 and equal to the current mobile station quantity subtracted by 1 (i.e., L≧2 and L=G−1), it indicates that one current mobile station 11 is absent from the contention access. In this case, the base station 10 uses the downlink to send a slot-stealing signal, and step S306 is performed to proceed contention access for the absent current mobile station 11 and accordingly allow it for register at a subsequent slot.

In step S307, the current mobile station quantity is subtracted by one and accordingly the process determines if it is 0 (step S308). If yes, the process returns to step S301, otherwise, proceeds to step S303.

Figure 3:
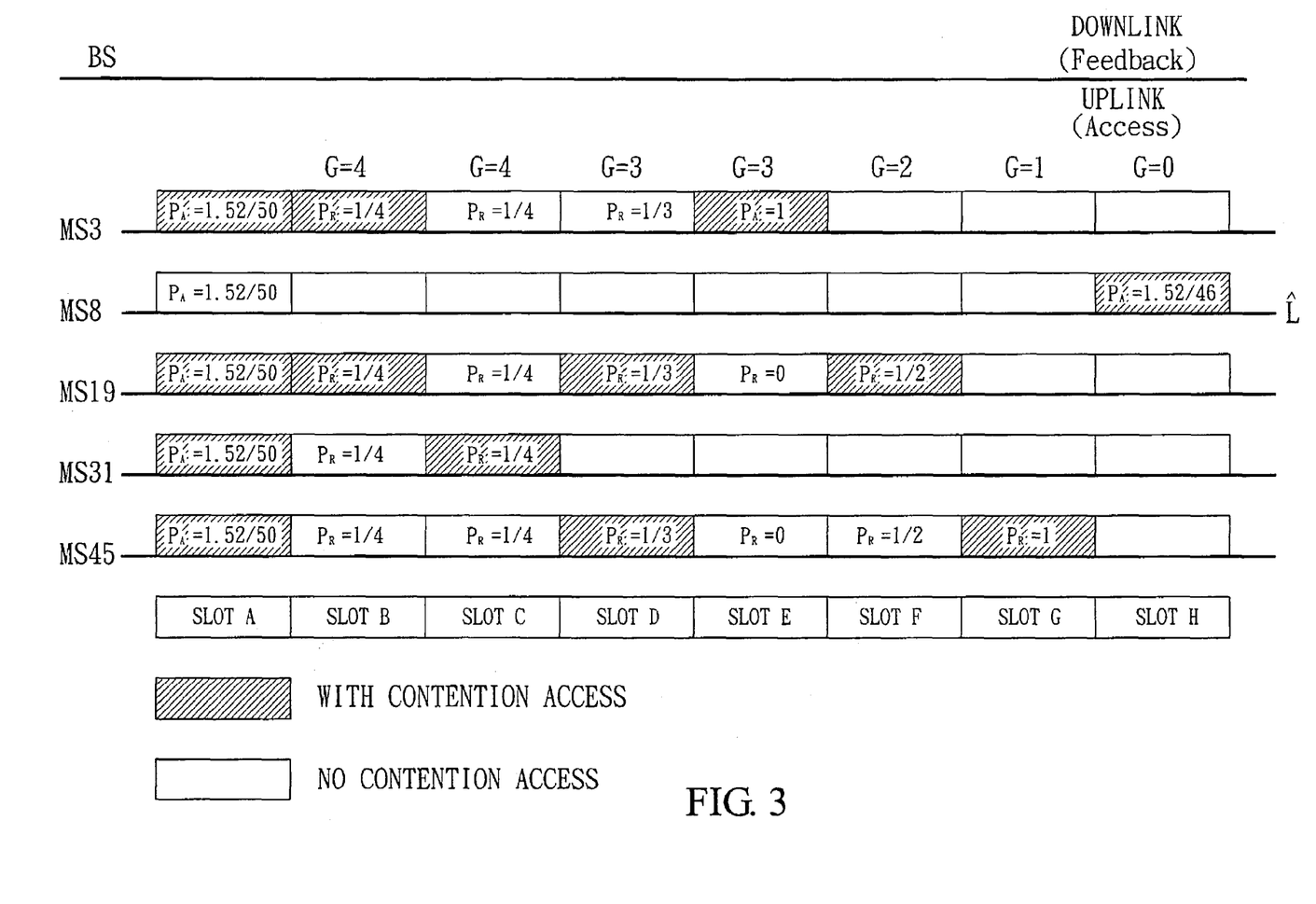
FIG. 3 is a schematic diagram of an operation example of FIG. 2 according to the invention.

FIG. 3 is a schematic diagram of an operation example of FIG. 2 according to the invention. In this example, for slot A, the base station transmits a predicted mobile station quantity $\hat{N}$ (=50) to mobile stations desiring to proceed contention access by a downlink. Each mobile station to be registered is determined by a random procedure such as CS-Aloha protocol to determine if it can proceed contention access at a subsequent slot. The random procedure can be computed by $P_A(\hat{N})=\kappa/\hat{N}$ and results in a probability of 1.52/50. In this case, mobile stations 3, 19, 31 and 45 can proceed contention access at subsequent slot B and thus current mobile station quantity G is 4.

For slot B, mobile stations 3, 19, 31 and 45 perform the cited CS-Aloha protocol to determine if they can proceed contention access at a subsequent slot. The random procedure results in $P_R(G)=1/G=\frac{1}{4}$. In this case, mobile stations 3 and 19 can proceed contention access. However, the base station detects and understands that the quantity of mobile stations capable of proceeding contention access (L=2) is greater than 1 and not equal to current mobile station quantity subtracted by 1 (G−1=3). That is, more than one mobile station can proceed contention access at the subsequent slot and thus the random procedure $P_R(G)$ is performed again.

For slot C, mobile stations 3, 19, 31 and 45 perform the cited CS-Aloha protocol again to determine if they can proceed contention access at a subsequent slot. The random procedure results in $P_R(G)=1/G=\frac{1}{4}$. In this case, only mobile station 31 can proceed contention access. The base station detects and understands that only mobile station 31 can proceed contention access. Therefore, mobile station 31 is allowed for registration at a subsequent slot and the current mobile station quantity is subtracted by 1, i.e., G=3.

For slot D, mobile stations 3, 19 and 45 perform the cited CS-Aloha protocol again to determine if they can proceed contention access at a subsequent slot. The random procedure results in $P_R(G)=1/G=\frac{1}{3}$. In this case, mobile stations 19 and 45 can proceed contention access. The base station detects and understands that the quantity of mobile stations capable of proceeding contention access (L=2) is greater than 1 and equal to the current mobile station quantity subtracted by 1 (G−1=2). That is, one mobile station (mobile station 3) is absent from contention access. Accordingly, the base station sends a slot-stealing signal by the downlink and the mobile station absent from contention access (mobile station 3) is allowed for registration at a subsequent slot (slot E). Also, the current mobile station quantity is decremented by 1.

For slot F, mobile stations 19 and 45 perform the cited CS-Aloha protocol again to determine if they can proceed contention access at a subsequent slot. The random procedure results in $P_R(G)=1G=\frac{1}{2}$. In this case, mobile stations 19 can proceed contention access. The base station detects and understands that only mobile station 19 can proceed contention access; i.e., the quantity of mobile station capable of proceeding contention access is 1. Therefore, mobile station 19 is allowed for registration at a subsequent slot and the current mobile station quantity is decremented by 1.

For slot H, the current mobile station quantity is 0 and thus the base station transmits a predicted mobile station quantity $\hat{N}$ (=50−4=46) to mobile stations desiring to proceed contention access by a downlink. Therefore, mobile station 8 is determined by a random procedure such as CS-Aloha protocol to see if it can proceed contention access at a subsequent slot, wherein the random procedure $P_A(\hat{N})=\kappa/\hat{N}=1.52/46$.

Furthermore, an estimation method implemented in the base station 10 is shown in FIGS. 4-7 to detect and distinguish at most 5 mobile stations.

Figure 4:
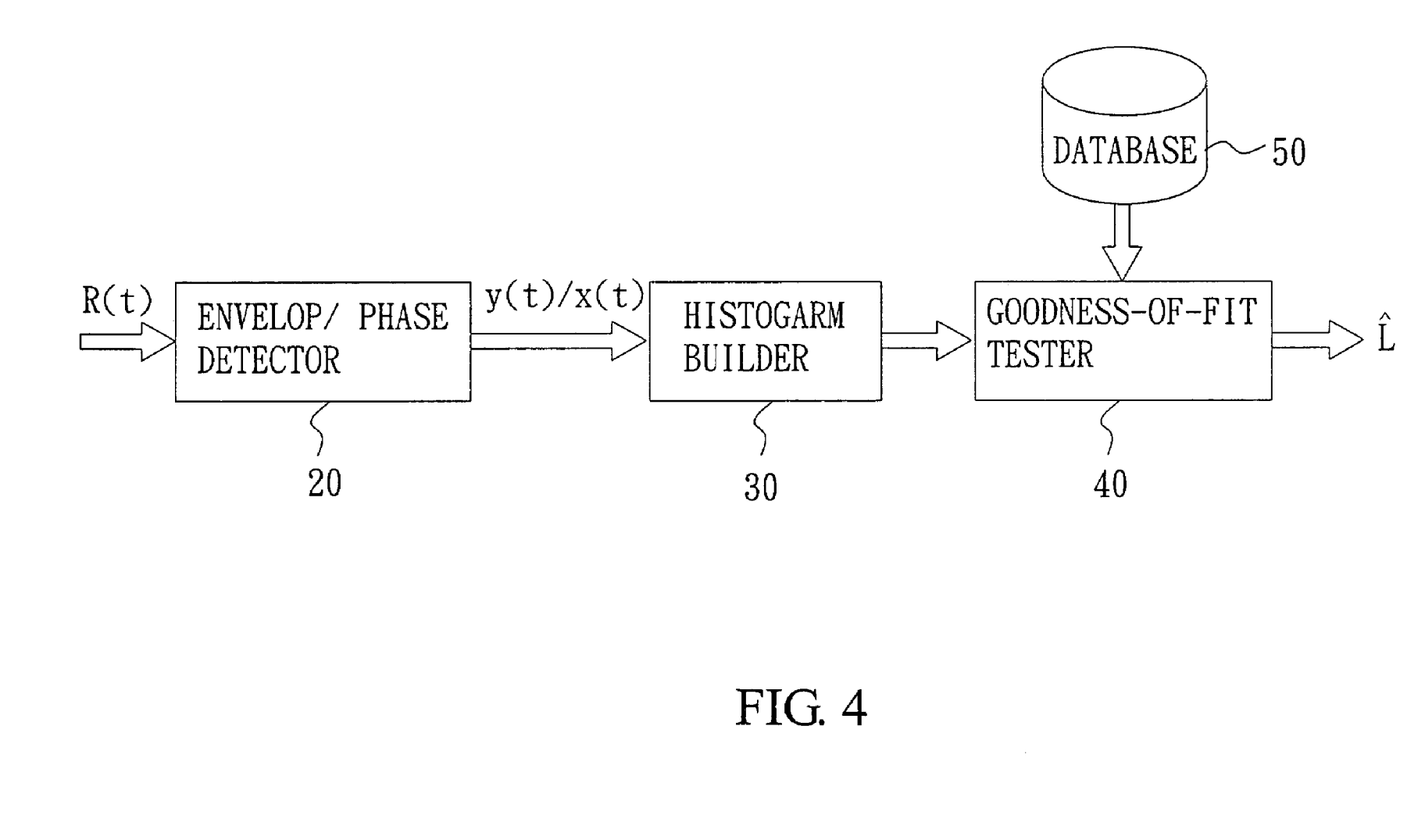
FIG. 4 is a schematic diagram of an embodiment of an estimation method applied to the contention access method of FIG. 2 according to the invention.

FIG. 4 is a schematic diagram of an embodiment of an estimation method applied to the contention access method of FIG. 2 according to the invention. The estimation method is implemented in the base station 10 with an envelop/phase detector 20, a histogram builder 30, a goodness-of-fit tester 40 and a database 50. The detector 20 generates an associated and normalized envelope/phase from signals received by the base station 10. The builder 30 quantizes the normalized envelope/phase as an envelope/phase histogram. The database 50 has pre-stored probability density function (pdf) distribution curves for 1 to 5 mobile stations concurrently requesting for register. The tester 40 conducts tests of goodness-of-fit for the envelope/phase histogram against the pre-stored pdf distribution curves to find an optimized match and accordingly estimate the cited at most 5 current mobile stations.

The cited pdf distribution curves for 1 to 5 mobile stations concurrently requesting for register in the wireless communication network can be obtained off-line and pre-stored in the database 50. Suppose that transmission channel is of Additive White Gaussian Noise (AWGN) channel, a signal R(t) received by the base station can be given under the AWGN as:

$$R(t) = \sum_{i=1}^{L} S_i e^{j[2\pi f_0 t + \phi_i(t)]} + n(t)e^{j2\pi f_0 t}, \qquad (1)$$

where L is mobile station quantity concurrently requesting for register in the wireless communication network, $S_i$ is the square root of ith mobile station's power at the base station 10, $f_0$ is the carrier frequency, $\phi_i(t)$ is the modulated waveform from the ith mobile station, and n(t) is Gaussian noise with zero mean and variance $2\sigma_n^2$. For simple illustration, assume that power control is exerted at each mobile station, leading to $S_i=S$ for all i. Let v(t) be the real part of R(t), the characteristic function of v(t) is:

$$f_v(t) = \prod_{i=1}^{L} J_0(S_i t)e^{-(\sigma_n^2 t^2/2)} = J_0^L(St)e^{-(\sigma_n^2 t^2/2)} \qquad (2)$$

where $J_0$, $J_0^L$ is Bessel function of the first kind and L kind of order zero, and y(t) is the envelope of R(t), so that the pdf of y(t) can be:

$$p_x(x) = (L \cdot \Lambda + 1)x \int_0^\infty t e^{-t^2/4} J_0(xt\sqrt{L \cdot \Lambda + 1}) J_0^L(t\sqrt{\Lambda}) dt, \qquad (4)$$

where $$\Lambda = \frac{S^2}{2\sigma_n^2} = SNR,$$

Figure 5A:
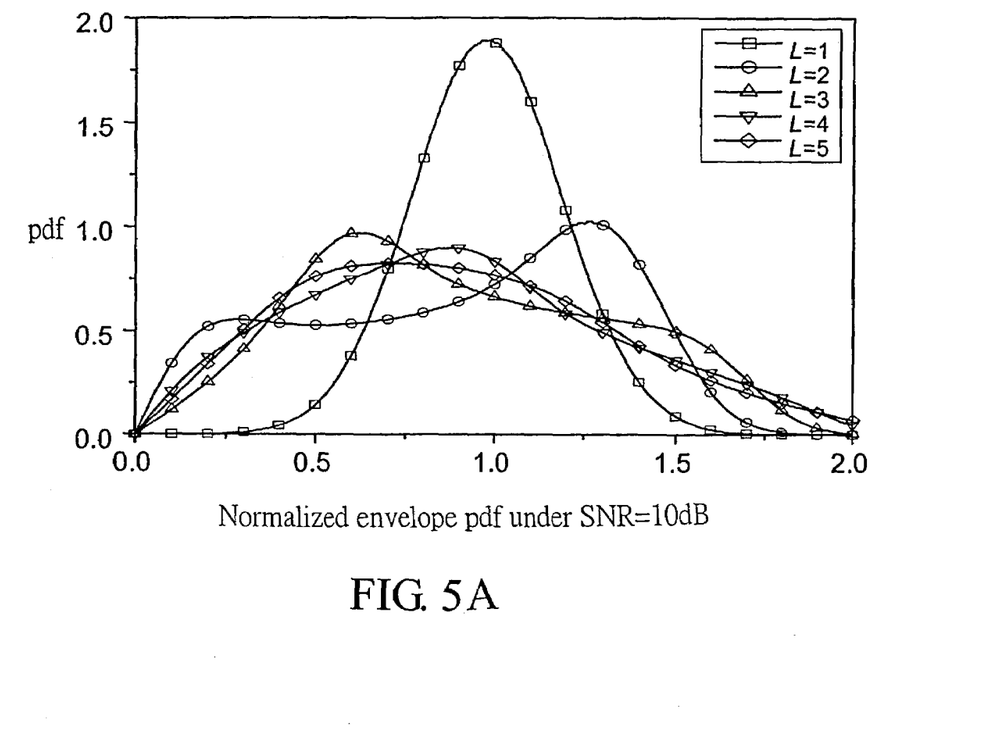
FIGS. 5A and 5B are distribution curves of normalized envelope df's under SNR=10 dB and 20 dB respectively, for simultaneous registration requests from 1-5 mobile stations.
Figure 5B:
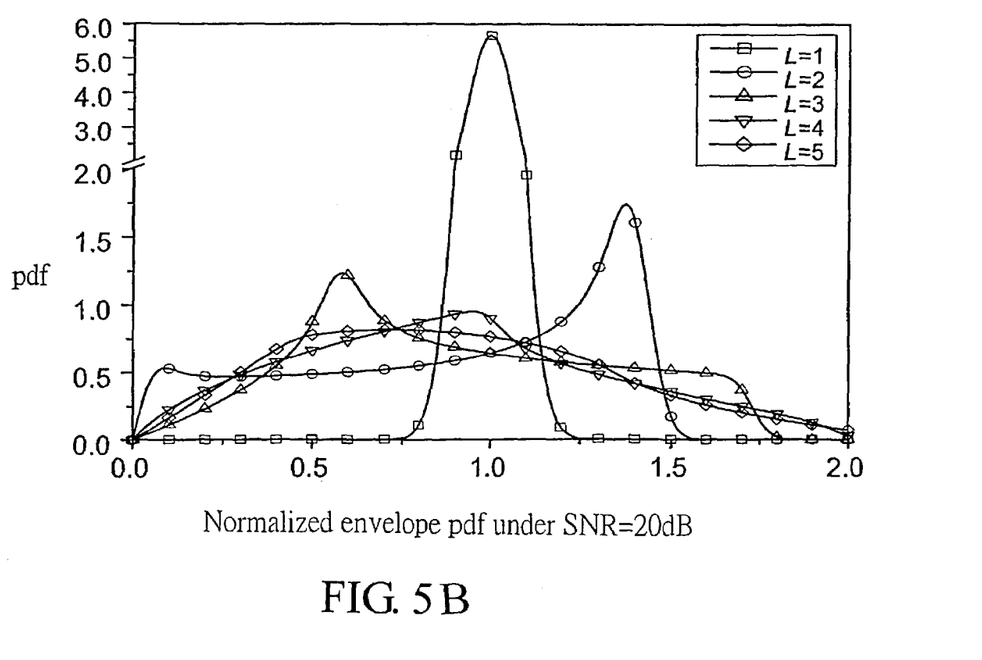

L is mobile station quantity concurrently requesting for registration in the wireless communication network, and $J_0$, $J_0^L$ is Bessel function of the first kind and L kind of order zero. Thus, the envelope pdf can be computed offline based on Equation (4). The resulting distribution curves of normalized envelope pdf for 1 to 5 mobile stations concurrently requesting for register under Signal-to-Noise Ratio (SNR) 10 and 20 dB are depicted in FIGS. 5A and 5B, respectively. Also, the resulting distribution curves are pre-stored in the database 50.

When transmission channel is of narrowband multipath fading channel, a signal R(t) received by the base station 10 can be given as:

$$R(t) = S_1 e^{j[2\pi f_0 t + \phi_1(t)]} \left\{ 1 + \sum_{i=2}^{L} S_i' e^{j\phi_i'(t)} \right\} + n(t)e^{j2\pi f_0 t}. \qquad (5)$$

where L is mobile station quantity concurrently requesting for register in the wireless communication network, $S_i$ is the square root of ith mobile station's power at the base station 10, $f_0$ is the carrier frequency, $\phi_i(t)$ is the modulated waveform from the ith mobile station, n(t) is Gaussian noise with zero mean and variance $2\sigma_n^2$, $S'_i=S_i/S_1$, and $\phi'_i=\phi_i-\phi_1$. Thus, the phase pdf of the signal R(t) can be derived as:

$$p_\theta(\theta | S_i) = \frac{1}{2\pi} \int_0^\infty \exp\left[-\left(\frac{r^2}{2} + \sum_{i=1}^{L} \frac{S_i^2}{2\sigma_n^2} - \frac{S_1 r \cos\theta}{\sigma_n}\right)\right] \qquad (6)$$

$$\prod_{i=2}^{L} I_0\left(\frac{S_i}{\sigma_n}\sqrt{r^2 + \frac{S_1^2}{\sigma_n^2} - \frac{2S_1 r}{\sigma_n}\cos\theta}\right) r dr,$$

where the phase θ is within the range between −π and π, and $I_0$ is the zero-th order modified Bessel function of the first kind. With $s_i^2$ replaced by $\Lambda_i \cdot 2\sigma_n^2$, Equation (6) is changed as:

$$p_\theta(\theta | \Lambda_i) = \frac{1}{2\pi} \int_0^\infty \exp\left[-\left(\frac{r^2}{2} + \sum_{i=1}^{L} \Lambda_i - \sqrt{2\Lambda_1} r \cos\theta\right)\right] \qquad (7)$$

$$\prod_{i=2}^{L} I_0\left(\sqrt{2\Lambda_i r^2 + 4\Lambda_1\Lambda_i - 4\Lambda_i\sqrt{2\Lambda_1} r\cos\theta}\right) r dr.$$

Figure 6A:
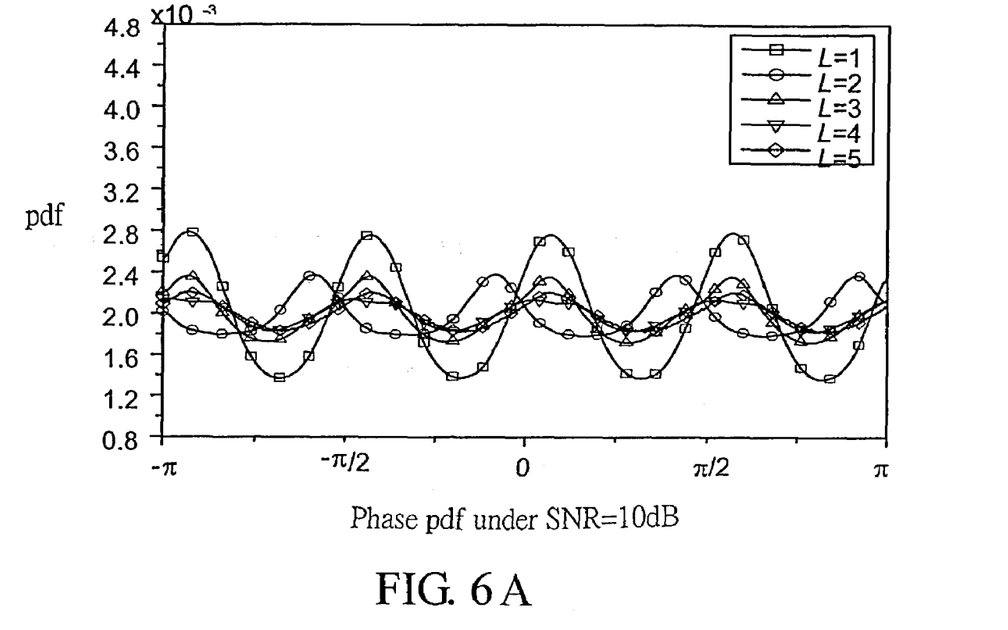
FIGS. 6A and 6B are distribution curves of normalized phase pdfs under SNR=10 dB and 20 dB respectively, for simultaneous registration requests from 1-5 mobile stations.
Figure 6B:
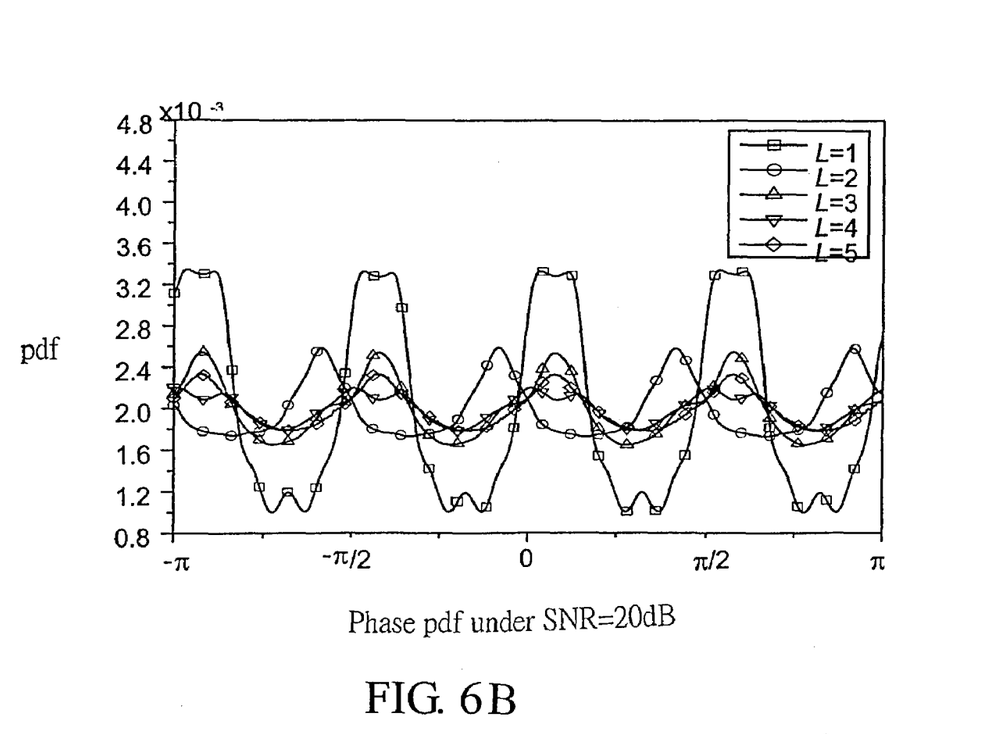

By un-conditioning the probability, Equation (7) can be changed as:

$$p(\theta) = \int_0^\infty \cdots \int_0^\infty p(\theta|\Lambda_i)p(\Lambda_1)\ldots p(\Lambda_L)d\Lambda_1\ldots d\Lambda_L, \quad (8)$$

where $p(\Lambda_i)$ is the pdf of the received signal's SNR, and $p(\theta)$ is a function of L and SNR. Thus, the phase pdf can be computed offline based on Equation (8). The resulting distribution curves of phase pdf for 1 to 5 mobile stations concurrently requesting for registration under Signal-to-Noise Ratio (SNR) 10 and 20 dB are depicted in FIGS. 6A and 6B, respectively. Also, the resulting distribution curves are pre-stored in the database 50.

Figure 7:
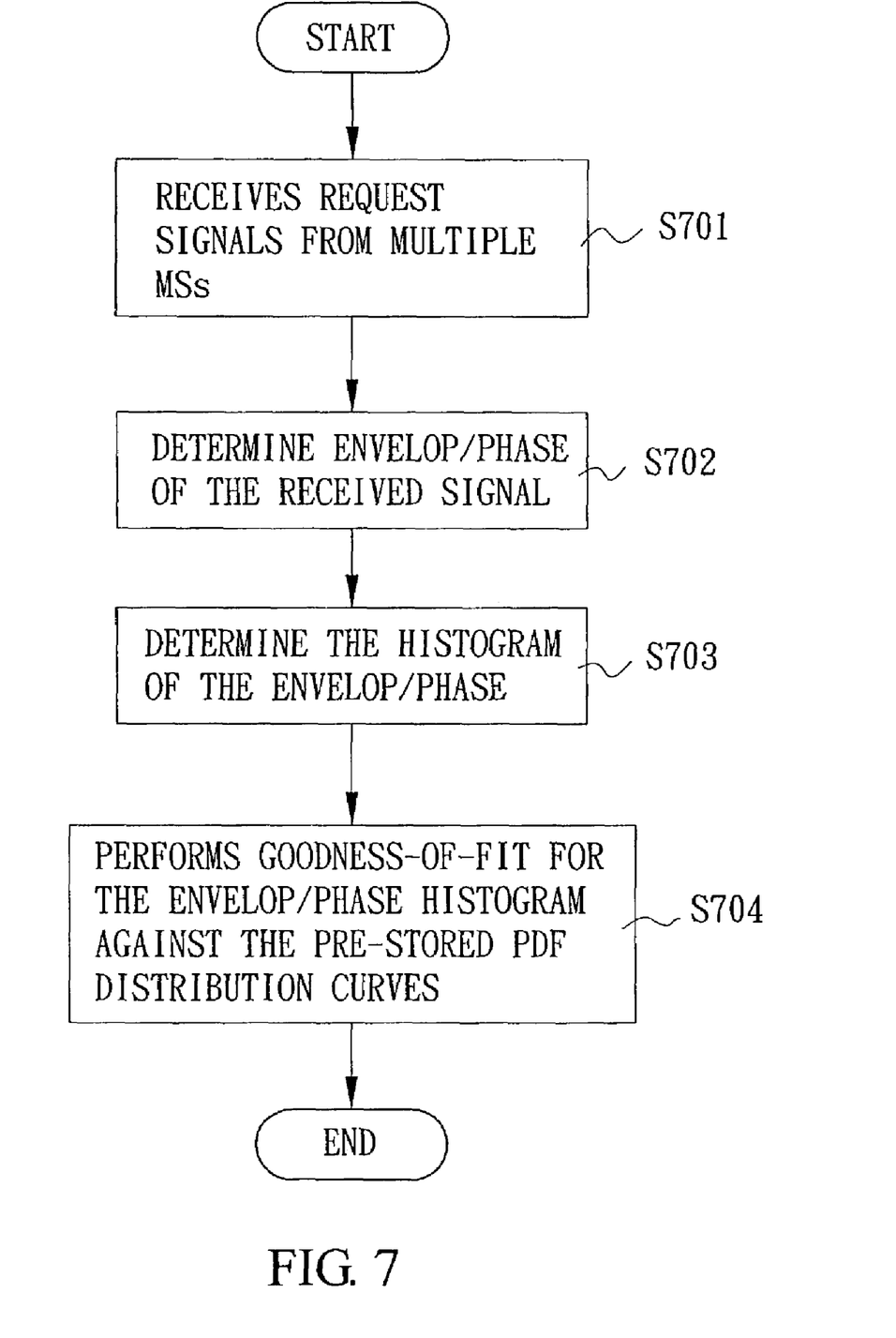
FIG. 7 is a flowchart of the estimation method according to the invention.

A flowchart of the inventive estimation method applying pdf to estimate mobile station quantity is shown in FIG. 7. In step S701, the base station 10 receives request signals transmitted by a plurality of mobile stations seeking to register.

When transmission channel is of Additive White Gaussian Noise (AWGN), the base station derives normalized envelope pdf distribution curves from a received signal. In step S702, the envelope/phase detector 20 converts the received signal to generate an associated envelope and a normalized envelope. In step S703, the histogram builder 30 converts the normalized envelope to generate an envelope histogram.

In step S704, the tester 40 conducts tests of goodness-of-fit for the envelope histogram against the pre-stored pdf distribution curves to find an optimized match and accordingly estimate the cited current mobile station quantity $\hat{L}$, up to 5.

When transmission channel is of narrowband multipath fading channel, the base station derives phase pdf distribution curves from a received signal. In step S702, the envelope/phase detector 20 converts the received signal to generate an associated phase. In step S703, the histogram builder 30 converts the associated phase to generate a phase histogram.

In step S704, the tester 40 conducts tests of goodness-of-fit for the phase histogram against the pre-stored pdf distribution curves to find an optimized match and accordingly estimate the cited current mobile station quantity $\hat{L}$, up to 5.

In step S704, candidates of test methods include Least Square (LS), Weighted LS (WLS), Maximum Likelihood (ML), and Maximum a Posteriori (MAP).

As aforementioned, the inventive estimation method applying probability density function (pdf) to estimate current mobile station quantity uses a database with pre-stored pdf curves to accurately estimate current mobile station quantity up to 5. The current mobile station quantity is the quantity of mobile stations capable of proceeding contention access at a subsequent slot, as cited above.

In summary, the inventive hexanary-feedback contention access (HFCA) method for wireless communication networks can rapidly and effectively complete contention access process using information of 1 to 5 mobile stations concurrently requesting for register in a wireless communication network. Also, in case of one current mobile station absent from contention access, a corresponding base station sends a slot-stealing signal by a downlink and the one current mobile station can proceed contention access and register at a subsequent slot. As such, it can speed up contention access and improve the performance of the wireless communication network.

Although the present invention has been explained in relation to its preferred embodiment, it is to be understood that many other possible modifications and variations can be made without departing from the spirit and scope of the invention as hereinafter claimed.

What is claimed is:

1. A hexanary-feedback contention access (HFCA) method with probability density function (pdf) based multi-user estimation for a wireless communication network, which generates a registrable mobile station when a plurality of mobile stations concurrently request for registration in the wireless communication network at a slot, wherein the wireless communication network has at least one base station capable of distinguishing at most 5 mobile stations concurrently requesting for registration and notifies each mobile station of mobile station quantity detected via a downlink, the method comprising the steps:

(A) using a random procedure to determine whether or not each mobile station to be registered is allowed proceeding contention access at a subsequent slot, wherein the quantity of mobile stations capable of proceeding contention access at the subsequent slot is defined as a current mobile station quantity;

(B) detecting the current mobile station quantity by the base station, and performing step (C) if the current mobile station quantity ranges from 2 to 5 and performing step (A) if the mobile station quantity is 1, wherein the base station implements an estimation method for detecting the mobile station quantity by means of pre-stored pdf distribution curves of 1 to 5 mobile stations concurrently requesting for registration in the wireless communication network, and the estimation method comprises the steps of:

(B1) computing an envelope of a signal received by the base station;

(B2) deriving a distribution curve of probability density function (pdf) from the envelope; and (B3) matching the distribution curve with the pre-stored pdf distribution curves for goodness-of-fit to estimate the mobile station quantity currently requesting for registration in the wireless network;

(C) performing a random procedure based on the current mobile station quantity to determine whether or not a contention access is proceeded at a new subsequent slot for each current mobile station;

(D) detecting a mobile station quantity by the base station, and if the detected mobile station quantity is 1, allowing the solely detected mobile station for registration and then reducing the current mobile station quantity by 1; and (E) performing step (A) if the current mobile station quantity is 0, otherwise, performing step (C).

2. The method as claimed in claim 1, wherein in step (D), if the mobile station quantity is 0 or greater than 1 and not equal to the current mobile station quantity subtracted by 1, step (C) is performed.

3. The method as claimed in claim 1, wherein in step (D), if the mobile station quantity is greater than 1 and equal to the current mobile station quantity subtracted by 1, the base station sends a slot-stealing signal via the downlink to allow a mobile station absent from contention access for registration.

4. The method as claimed in claim 1, wherein in step (A), the random procedure is CS-Aloha protocol as: $P_A(\hat{N})=\kappa/\hat{N}$, $\kappa=1.52$, $\hat{N}\approx 50$.

5. The method as claimed in claim 1, wherein in step (C), the random procedure is CS-Aloha protocol as: PR(G)=1/G, for G=the current mobile station quantity.

6. An estimation method capable of estimating mobile station quantity by probability density function (pdf) for a wireless communication network having at least one base station which is pre-stored with pdf distribution curves of mixed signals caused by 1 to N mobile stations concurrently requesting for registration in the wireless communication network, the method comprising the steps of:
   (A) computing an envelope of a signal received by the base station;
   (B) deriving a distribution curve of probability density function (pdf) from the envelope; and
   (C) matching the distribution curve with the pdf distribution curves pre-stored for goodness-of-fit to estimate the mobile station quantity currently requesting for register in the wireless network.

7. The method as claimed in claim 6, wherein in step (B), the envelope's pdf in an Additive White Gaussian Noise (AWGN) channel is $$p_x(x) = (L \cdot \Lambda + 1)x \int_0^\infty t e^{\frac{-t^2}{4}} J_0\left(xt\sqrt{L \cdot \Lambda + 1}\right) J_0^L\left(t\sqrt{\Lambda}\right) dt,$$

where $\Lambda = \frac{S^2}{2\delta_n^2} = SNR$, $2\sigma_n^2$ is variance of Gaussian noise, S is the square root of mobile station's power at the base station, L is the mobile station quantity concurrently requesting for register in the wireless communication network, and $J_0$, $J_0^L$ is Bessel function of the first kind and L kind of order zero.

8. The method as claimed in claim 6, wherein in step (C), the matching applies Least Square (LS), Weight LS (WLS), Maximum Likelihood (ML), or Maximum a Posteriori (MAP) for goodness-of-fit.

9. The method as claimed in claim 6, wherein N is 5.

10. The method as claimed in claim 6, wherein in step (A), the envelope is normalized.

11. An estimation method capable of estimating mobile station quantity by probability density function (pdf) for a wireless communication network having at least one base station which is pre-stored with pdf distribution curves of mixed signals caused by 1 to N (N<=5) mobile stations concurrently requesting for registration in the wireless communication network, the method comprising the steps of:
   (A) computing a phase of a signal received by the base station;
   (B) deriving a distribution curve of probability density function (pdf) from the phase; and
   (C) matching the distribution curve with the pdf distribution curves pre-stored for goodness-of-fit to estimate the mobile station quantity currently requesting for registration in the wireless network.

12. The method as claimed in claim 11, wherein in step (C), the matching applies Least Square (LS), Weight LS (WLS), Maximum Likelihood (ML), or Maximum a Posteriori (MAP) for goodness-of-fit.

13. The method as claimed in claim 11, wherein N is 5.

14. The method as claimed in claim 11, wherein in step (A), the envelope is normalized.

* * * * *